United States Patent Office 3,156,645
Patented Nov. 10, 1964

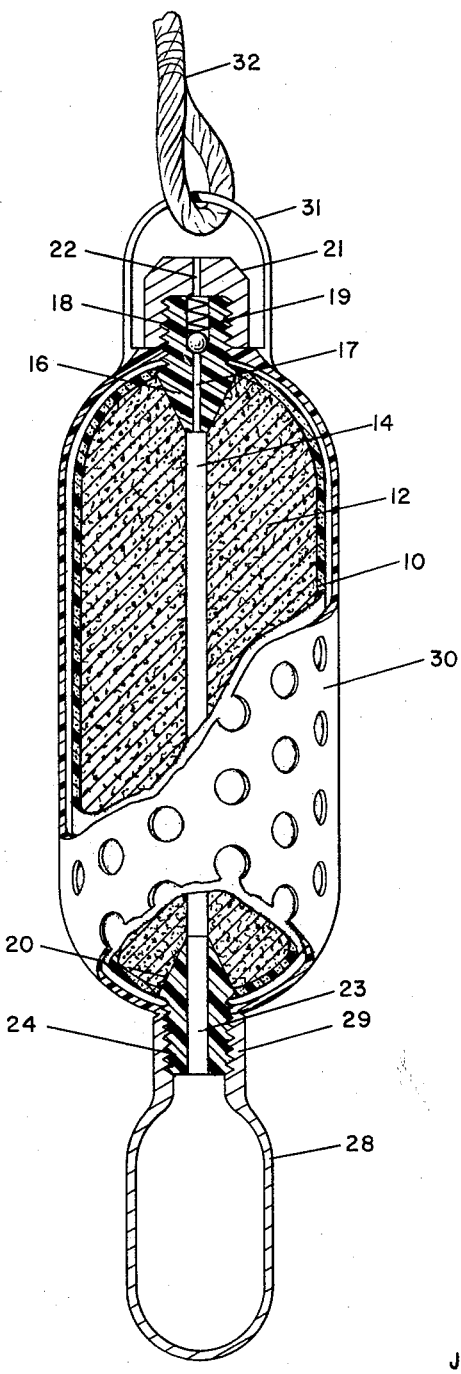

3,156,645
EMERGENCY SEA WATER DEMINERALIZER
Jay W. Chapin, 3149 S. L St., Oxnard, Calif., and John S. Williams, Rte. 1, Box 236, Newbury Park, Calif.
Filed June 26, 1962, Ser. No. 205,471
1 Claim. (Cl. 210—120)
(Granted under Title 35, U.S. Code (1952), sec. 266)

The invention described herein may be manufactured and used by or for the Government of the United States of America for governmental purposes without the payment of any royalties thereon or therefor.

This invention relates generally to sea water demineralization and particularly to the obtaining of fresh potable water from sea water by means employing reverse osmosis.

The necessity of obtaining fresh water at sea under emergency conditions is a continuing problem that requires numerous angles of approach. Various types of equipment for such purposes have been developed during the last twenty years. To date, the most successful have been based on chemical treatment of sea water or have employed various types of small portable stills.

The chemical approach, while practicable, does not result in really good drinking water and, many times, produces undesirable side effects in the bodies of those who may be idiosyncratic to the chemicals utilized. Also, such chemicals are subject to aging effects when stored for considerable periods of time in emergency kits and rapidly lose their effectiveness at an accelerating rate. The various types of stills provided are relatively complicated and usually require a source of heat. Most depend on the sun and hence are inoperable and useless during night hours and during protracted periods of foggy weather. Such stills are fairly heavy and contain numerous parts and appurtenances that very quickly get lost or are otherwise rendered inoperable by exposure to salt water and spray.

Many processes of desalting sea water have been proposed and are under current intense investigation. For our purposes of developing an emergency sea water demineralizer that is simple, rugged, fool-proof, and reliable under any weather condition at sea, the phenomenon of osmosis has been chosen as the practical approach.

In natural osmosis, water flows from a solution of lower concentration on one side of a semipermeable membrane to the more saline solution on the other side. This merely equalizes concentrations on either side of the membrane and does not produce fresh water. However, in reverse osmosis, normal osmotic driving pressure can be overcome by applying mechanical pressure which exceeds the osmotic pressure and which is opposite to it in direction. This forces water through the membrane from the briny side to the relatively fresh side, accentuating the initial differences in concentration and yielding brine and product water. Normal osmotic pressure for the sea water-fresh water pair is about 25 atmospheres or 368 pounds per square inch.

The object of our invention, therefore, is to produce an emergency sea water demineralizer that operates on the principle of reverse osmosis.

Another object of our invention is to produce an emergency sea water demineralizer that is simple, rugged and is presented in a single package.

A further object of our invention is to produce an emergency sea water demineralizer that is useable anywhere on the open sea under any condition of visibility or at any time of the day or night.

Other objects and advantages will appear in connection with the following detailed description and single figured drawing wherein:

FIGURE 1 is a partly cross-sectioned elevation of our invention.

With reference to the figure, the basic semipermeable membrane 10 which is formulated to exclude mineral molecules is cast or wrapped on a pressure resistant unit 12 of semi-porous material capable of resisting the maximum pressures to which it will be exposed. The pressure resistant unit 12, which may be of semi-porous carbon, plastic, or sintered metal is provided with a central chamber 14 which may be widened at the top and bottom ends thereof, to accept the conical shaped plugs 16 and 20.

Conical plug 16 is provided with a central passage 17 which leads from the chamber 14 to atmosphere through the spring loaded check valve 18. As shown, upper plug 16 is provided with an externally threaded neck 19 adapted to receive the correspondingly internally threaded cap 21. The latter is provided with a reduced orifice 22 which communicates with the plug passage 17 through the check valve 18.

Conical lower plug 20 is also provided with a central passage 23 leading downwardly into collecting bottle 28. This plug 20 is also provided with an externally threaded neck 24 which is adapted to receive the internally threaded neck 29 of the bottle 28.

The pressure resistant unit 12 and its semi-permeable membrane 10 may be further covered with a perforated protective covering 30 having a bail 31 secured to its upper end. A nylon or other suitable line or light chain 32 may be secured to this bail 31 for lowering and raising the device from the surface of the sea.

In actually constructing a working device, the pressure resistant unit may be made with a diameter of 7½" and a length of 13". The collecting bottle may be 4" in diameter with a length of 6". The semi-permeable membrane 10 may be of foraminous plastic or other suitable material possessing the property of excluding mineral molecules. The pressure resistant semi-porous unit 12 may be of carbon, activated carbon, plastic material, or suitable sintered metal. The plugs 16 and 20 may be of plastic, wood, or metal. The spring loaded check valve 18 may comprise a metal or plastic ball as shown with perhaps a beryllium spring, or some other spring material not easily corroded in a humid atmosphere or by sea water. The external perforated covering may be of elastic polyethylene plastic or other suitable material. Its function, of course, is to afford protection to the important membrane 10 and to supply the lifting bail 31 which may be integrally part of the covering 30 or may be suitably secured thereto.

The operation of the device may be accomplished by simply lowering it over the side of the raft or boat into sea water of at least 1000 feet depth. While a depth of approximately 750 feet is sufficient to initiate the reverse osmotic process, it naturally accelerates with increased depths and consequent pressures. The maximum depth at which the device can operate is limited by its structural strength and by its built-in buoyancy. Within the limits of the structural strength, the latter can be adjusted to allow the device to operate at its maximum depth. For deepest and most efficient operation, many of the parts designated as being made from wood, plastic, or other lighter material can be fashioned from metal. In connection with the sizes and dimensions given above, a calculated over-all weight of 22 pounds should allow reaching a depth of 3000 feet in sea water.

After passing the 750 foot mark, the fresh water derived from the sea water starts permeating inwardly into chamber 14. The demineralized water then percolates downwardly into the collecting bottle. The trapped air carried down in chamber 14 and the collecting bottle collects in the upper portion of chamber 14 and is compressed until its pressure equals that of the surrounding sea water. As the device is raised, the pressure differential becomes greater until it exceeds that of the spring. At this point, the chamber pressure is relieved and thereafter kept to that differential as established by the setting of the spring in the spring loaded check valve. Thus, when the demineralizer reaches the hands of the operator, the internal pressure is reduced to a fairly close approximation to that of sea level atmosphere and no danger will be experienced when removing the collecting bottle 28.

The above described and illustrated embodiment is to be understood as merely illustrative of our emergency sea water demineralizer. Many changes and modifications may be made therein and thereon and may suggest themselves to those skilled in the art. It is considered that all such changes and modifications will fall within the spirit of the invention and the scope of the appended claim, wherein we claim:

An emergency sea water demineralizer employing reverse osmosis at comparatively great ocean depths comprising, in combination:

an elongated substantially cylindrical pressure resistant unit consisting of semi-porous material;

a generally narrow tubular axial chamber formed interiorly of said pressure resistant unit, said tubular axial chamber opening out to form short conical cavities in the upper and lower ends of said resistant unit;

a conical plug secured into the upper cone shaped end of said axial chamber, said conical plug having an upwardly extending threaded portion adapted to receive a threaded cap, said plug and said cap being furnished with reduced bores concentric with said axial chamber, said plug having an outer enlarged bore concentric with its reduced bore for the reception of a ball check surmounted by a cylindrical compression spring, the compression of said spring being controlled by the positioning of said cap on the said upwardly extending threaded portion of said plug;

a similarly shaped conical plug secured into the lower cone shaped end of said resistant unit, said conical plug having a downwardly extending threaded portion adapted to receive a threaded substantially massive hollow collecting bottle for collecting the fresh water seeping into said axial chamber, said lower conical plug having an axial aperture concentric with said axial chamber;

a semi-permeable salt excluding membrane structure closely surrounding and supported by said pressure resistant unit;

an outer perforated protective covering closely surrounding and enclosing said semi-permeable membrane, said covering having a light bail secured to its upper end; and light cable means attached to said bail for lowering said demineralizer into a body of sea water from the horizontal surface thereof to a depth sufficient to effect said reverse osmosis, said parts of said demineralizer being proportioned so as to maintain said axial chamber in a position normal to said horizontal surface with said ball check at the upper end of said axial chamber and said collecting bottle at the lower end of said axial chamber.

References Cited in the file of this patent

UNITED STATES PATENTS

| | | |
|---|---|---|
| 2,404,872 | Walker | July 30, 1946 |
| 2,715,097 | Guarino | Aug. 9, 1955 |
| 2,864,506 | Hiskey | Dec. 16, 1958 |
| 2,987,472 | Kollsman | June 6, 1961 |
| 3,060,119 | Carpenter | Oct. 23, 1962 |